(12) United States Patent  (10) Patent No.: US 8,689,541 B2
McDonald et al.  (45) Date of Patent: Apr. 8, 2014

(54) VALVETRAIN CONTROL METHOD AND APPARATUS FOR CONSERVING COMBUSTION HEAT

(75) Inventors: Mike M. McDonald, Macomb, MI (US); William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 367 days.

(21) Appl. No.: 13/028,522

(22) Filed: Feb. 16, 2011

(65) Prior Publication Data

US 2012/0204545 A1  Aug. 16, 2012

(51) Int. Cl.
*F01N 3/00* (2006.01)
*F01N 3/10* (2006.01)

(52) U.S. Cl.
USPC .............. 60/284; 60/285; 60/299; 60/300

(58) Field of Classification Search
USPC ........ 60/274, 284, 285, 299, 300; 123/21, 64, 123/676
See application file for complete search history.

(56) References Cited

U.S. PATENT DOCUMENTS

| | | |
|---|---|---|
| 3,964,263 A | 6/1976 | Tibbs |
| 4,641,613 A | 2/1987 | Delesalle |
| 4,805,571 A | 2/1989 | Humphrey |
| 4,892,067 A | 1/1990 | Paul et al. |
| 4,930,465 A | 6/1990 | Wakeman et al. |
| 4,960,083 A | 10/1990 | Seki et al. |
| 5,107,432 A | 4/1992 | Martinelli |
| 5,154,143 A | 10/1992 | Stutzenberger |
| 5,588,402 A | 12/1996 | Lawrence |
| 5,680,841 A | 10/1997 | Hu |
| 5,732,677 A | 3/1998 | Baca |
| 5,787,705 A | 8/1998 | Thoreson |
| 6,443,108 B1 | 9/2002 | Brehob et al. |
| 6,904,752 B2 | 6/2005 | Foster et al. |
| 6,918,358 B2 | 7/2005 | Hu |
| 6,922,986 B2 | 8/2005 | Rozario |
| 6,968,825 B2 | 11/2005 | Hitomi et al. |
| 7,079,941 B2 | 7/2006 | Tetsuno et al. |
| 7,103,468 B2 | 9/2006 | Wakashiro et al. |
| 7,258,101 B1 | 8/2007 | McDonald et al. |
| 7,380,535 B2 | 6/2008 | Hartmann et al. |
| 7,624,709 B2 | 12/2009 | Cao |
| 7,757,657 B2 | 7/2010 | Albertson et al. |
| 7,913,669 B2 | 3/2011 | Luken et al. |
| 7,918,205 B2 | 4/2011 | Wermuth et al. |
| 8,011,331 B2 | 9/2011 | Albertson et al. |
| 8,079,335 B2 | 12/2011 | Rollinger et al. |
| 8,191,516 B2 | 6/2012 | Moon et al. |
| 8,360,036 B2 | 1/2013 | Riegger et al. |
| 8,424,289 B2 | 4/2013 | Narayanaswamy et al. |
| 2002/0083904 A1* | 7/2002 | Otterspeer et al. .............. 123/21 |

(Continued)

OTHER PUBLICATIONS

Carburetor vs. Fuel Injection: Understanding the Pros and Cons, CarsDirect.com, Aug. 16, 2010.*

*Primary Examiner* — Audrey K Bradley

(57) ABSTRACT

An engine control system includes a catalyst module and a cylinder module. The catalyst module determines a catalyst temperature. The cylinder module selectively switches operation of a first cylinder from a first engine cycle having four strokes to a second engine cycle having N times four strokes, based on the catalyst temperature, wherein N is an integer greater than one. A related method is also provided.

20 Claims, 7 Drawing Sheets

(56) References Cited

U.S. PATENT DOCUMENTS

| | | |
|---|---|---|
| 2004/0173166 A1 | 9/2004 | Kobayashi et al. |
| 2004/0206071 A1 | 10/2004 | Glugla et al. |
| 2005/0210868 A1* | 9/2005 | Funabashi ................ 60/277 |
| 2007/0113542 A1* | 5/2007 | Lewis ....................... 60/285 |
| 2008/0319594 A1 | 12/2008 | Shibata et al. |
| 2010/0064992 A1 | 3/2010 | Albertson et al. |
| 2010/0224151 A1 | 9/2010 | Moon et al. |
| 2011/0106406 A1 | 5/2011 | Moriya |
| 2011/0139117 A1 | 6/2011 | Kar et al. |
| 2011/0144888 A1 | 6/2011 | Rollinger et al. |
| 2011/0265456 A1* | 11/2011 | Fiveland et al. ............ 60/285 |
| 2013/0055972 A1 | 3/2013 | Mc Donald et al. |
| 2013/0060453 A1 | 3/2013 | Mc Donald |

* cited by examiner

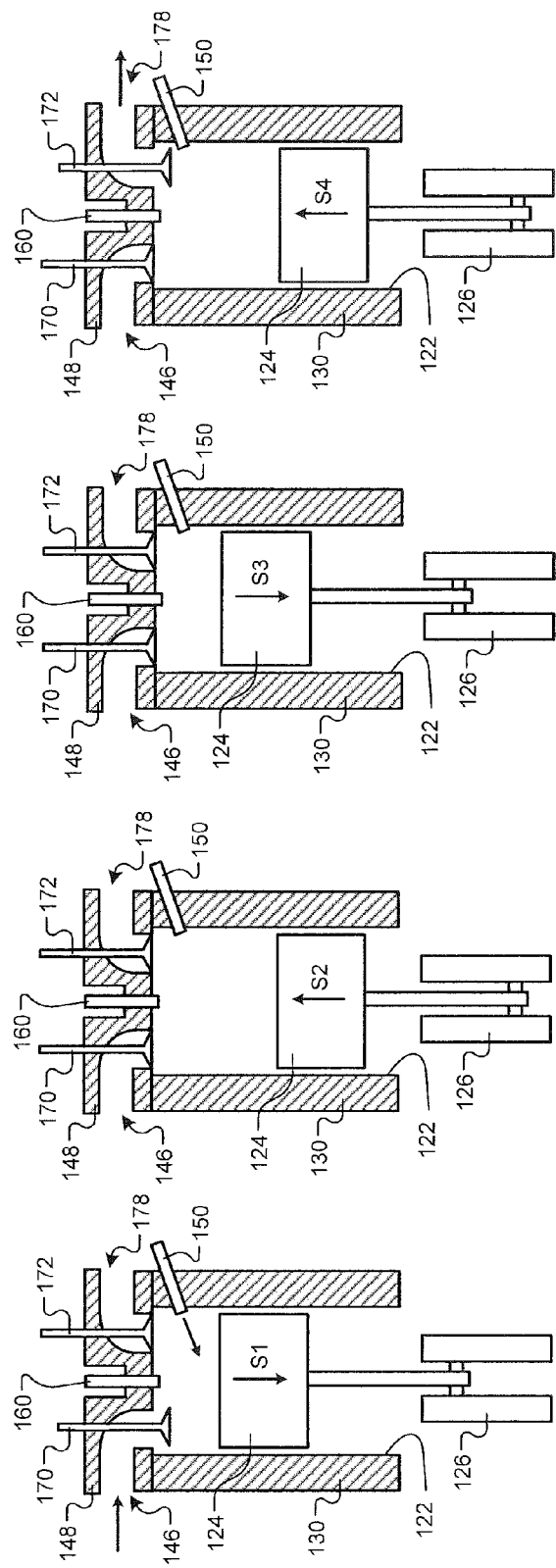

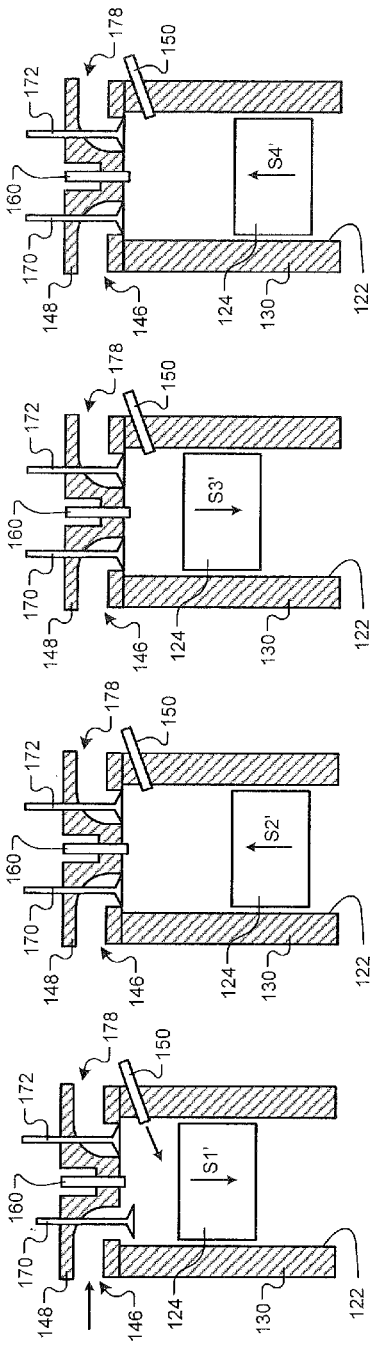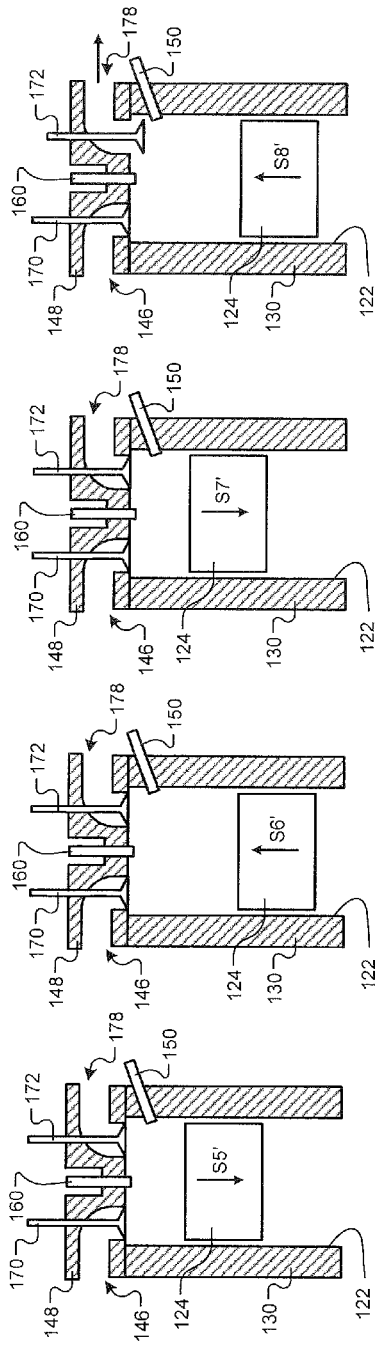

VALVETRAIN CONTROL METHOD AND APPARATUS FOR CONSERVING COMBUSTION HEAT

FIELD

The present disclosure relates to control systems and methods for internal combustion engines and, more particularly, to control systems and methods for valvetrain control during engine warm-up periods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles typically include an engine system that produces drive torque for driving one or more wheels. Hybrid engine systems include an internal combustion engine used alone or in combination with an electric motor to produce drive torque. Internal combustion engines combust an air and fuel mixture (A/F mixture) within cylinders to drive a crankshaft via pistons located in the cylinders, which produces drive torque. Air and fuel flow into and out of the cylinders may be controlled by valves that selectively open to allow flow into and/or out of the cylinders and close to trap air and fuel within the cylinders. Operation of the valves is controlled by a valvetrain.

By-products of combustion are exhausted from the engine via an exhaust system. The exhaust system may include a catalytic converter that reduces a concentration of certain by-products present in the exhaust, such as nitrogen oxides ($NO_X$), carbon monoxide (CO), unburned hydrocarbons (HC), sulfur oxides ($SO_X$), and other compounds.

Catalytic converters include a catalyst that facilitates chemical reactions that reduce the concentration of the by-products. For example, three-way catalytic converters include a catalyst that converts $NO_X$ to nitrogen and oxygen, CO to carbon dioxide ($CO_2$), and HC to $CO_2$ and water ($H_2O$). Catalysts, in order to function properly, must be operated at temperatures above what may be referred to as a light off temperature. After prolonged idle periods, the temperature of the catalyst may be below the light off temperature.

SUMMARY

In one form, the present disclosure provides an engine control system. The engine control system includes a catalyst module and a cylinder module. The catalyst module determines a catalyst temperature. The cylinder module selectively switches operation of a first cylinder from a first engine cycle to a second engine cycle based on the catalyst temperature. The first engine cycle has four strokes and the second engine cycle has N times four strokes, wherein N is an integer greater than one.

In one feature, the cylinder module switches operation to the second engine cycle after the catalyst temperature is greater than a predetermined light-off temperature. In further features, the cylinder module switches operation of the first cylinder when: (a) an engine temperature is within a predetermined temperature range, (b) an estimated engine torque output is less than a predetermined torque, and (c) an engine speed is less than a predetermined speed. In still further features, the cylinder module supplies fuel to the first cylinder during one stroke of the second engine cycle and refrains from supplying fuel to the first cylinder during other strokes of the second engine cycle. In related features, the cylinder module supplies a stoichiometric air/fuel mixture to the first cylinder during the one stroke.

In yet further features, the cylinder module operates the first cylinder in the first engine cycle while an engine temperature is less than a predetermined engine temperature and the catalyst temperature is less than a predetermined light-off temperature. In related features, the cylinder module switches operation of the first cylinder to the second engine cycle after the catalyst temperature is greater than the predetermined light-off temperature. In still further features, the cylinder module switches operation of the first cylinder to the first engine cycle after a predetermined period. In related features, the cylinder module switches operation of a second cylinder to the second engine cycle on a next intake stroke after the first cylinder switches to the first engine cycle.

In other features, the first cylinder is closed for at least four consecutive strokes when operating in the second engine cycle. In still other features, the cylinder module controls an air/fuel ratio of the first cylinder by controlling a mass of fuel supplied upstream of the first cylinder. In alternate features, the cylinder module controls an air/fuel ratio of the first cylinder by controlling a mass of fuel supplied directly to the first cylinder.

In another form, the present disclosure provides a method for controlling an engine. The method includes determining a catalyst temperature, and selectively switching operation of a first cylinder from a first engine cycle to a second engine cycle. The first engine cycle has four strokes and the second engine cycle has N times four strokes, wherein N is an integer greater than one.

In one feature, the selectively switching includes switching operation to the second engine cycle after the catalyst temperature is greater than a predetermined light-off temperature. In further features, the selectively switching includes switching operation of the first cylinder when: (a) an engine temperature is within a predetermined temperature range, (b) an estimated engine torque output is less than a predetermined torque, and (c) an engine speed is less than a predetermined speed. In still further features, the method further includes supplying fuel to the first cylinder during one stroke of the second engine cycle, and refraining from supplying fuel to the first cylinder during other strokes of the second engine cycle. In related features, the supplying fuel includes supplying a stoichiometric air/fuel mixture to the first cylinder during the one stroke.

In yet further features, the method includes operating the first cylinder in the first engine cycle while an engine temperature is less than a predetermined engine temperature and the catalyst temperature is less than a predetermined light-off temperature. In related features, the method includes switching operation of the first cylinder to the second engine cycle after the catalyst temperature is greater than the predetermined light-off temperature. In still further features, the method includes switching operation of the first cylinder to the first engine cycle after a predetermined period. In related features, the method includes switching operation of a second cylinder to the second engine cycle on a next intake stroke after the switching operation of the first cylinder to the first engine cycle.

In other features, the method includes closing the first cylinder for at least four consecutive strokes of the second engine cycle. In still other features, the method includes controlling an air/fuel ratio of the first cylinder by controlling a mass of fuel supplied upstream of the first cylinder. In alternate features, the method includes controlling an air/fuel ratio of the first cylinder by controlling a mass of fuel supplied directly to the first cylinder.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a schematic diagram illustrating an intake stroke of a primary engine cycle according to the present disclosure;

FIG. 5 is a schematic diagram illustrating a compression stroke of the primary engine cycle;

FIG. 6 is a schematic diagram illustrating a power stroke of the primary engine cycle;

FIG. 7 is a schematic diagram illustrating an exhaust stroke of the primary engine cycle;

FIG. 8 is a schematic diagram illustrating an intake stroke of a heat-conserving engine cycle according to the present disclosure;

FIG. 9 is a schematic diagram illustrating a first compression stroke of the heat-conserving engine cycle;

FIG. 10 is a schematic diagram illustrating a power stroke of the heat-conserving engine cycle;

FIG. 11 is a schematic diagram illustrating a second compression stroke of the heat-conserving engine cycle;

FIG. 12 is a schematic diagram illustrating a first expansion stroke of the heat-conserving engine cycle;

FIG. 13 is a schematic diagram illustrating a second compression stroke of the heat-conserving engine cycle;

FIG. 14 is a schematic diagram illustrating a second expansion stroke of the heat-conserving engine cycle;

FIG. 15 is a schematic diagram illustrating an exhaust stroke of the heat-conserving engine cycle;

DETAILED DESCRIPTION

Figure 1:
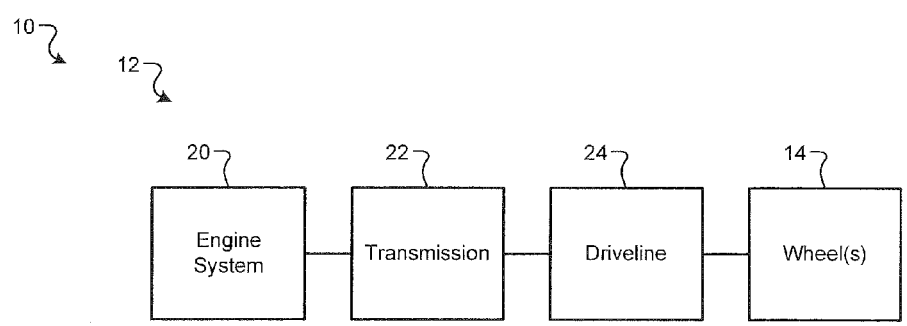
FIG. 1 is a functional block diagram illustrating an exemplary vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

With particular reference to FIG. 1, a functional block diagram of an exemplary vehicle system 10 is presented. The vehicle system 10 includes a powertrain 12 that drives one or more wheels 14 of the vehicle. The powertrain 12 includes an engine system 20, a transmission 22, and a driveline 24. The engine system 20 produces drive torque that is transmitted through the transmission 22 at one or more gear ratios to the driveline 24 coupled to the wheels 14. The present disclosure is not limited to transmissions or drivelines of a particular type. For example, the transmission 22 may be an automatic transmission or manual transmission. Additionally, the present disclosure is not limited to powertrains of a particular layout. For example, the powertrain 12 may have a front-wheel-drive layout, a rear-wheel-drive layout, or an all-wheel-drive layout.

Figure 3:
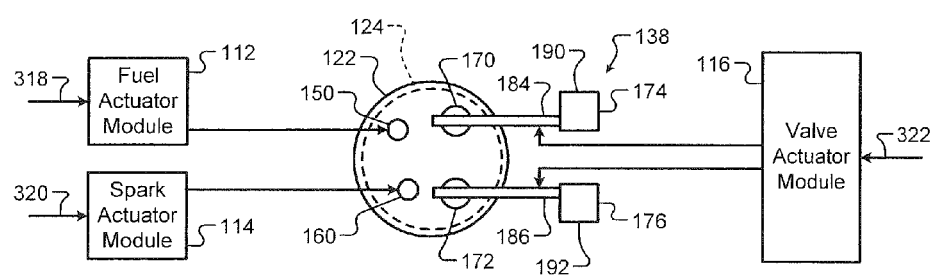
FIG. 3 is a functional block diagram illustrating portions of an exemplary valvetrain and valvetrain control system according to the present disclosure.
Figure 2:
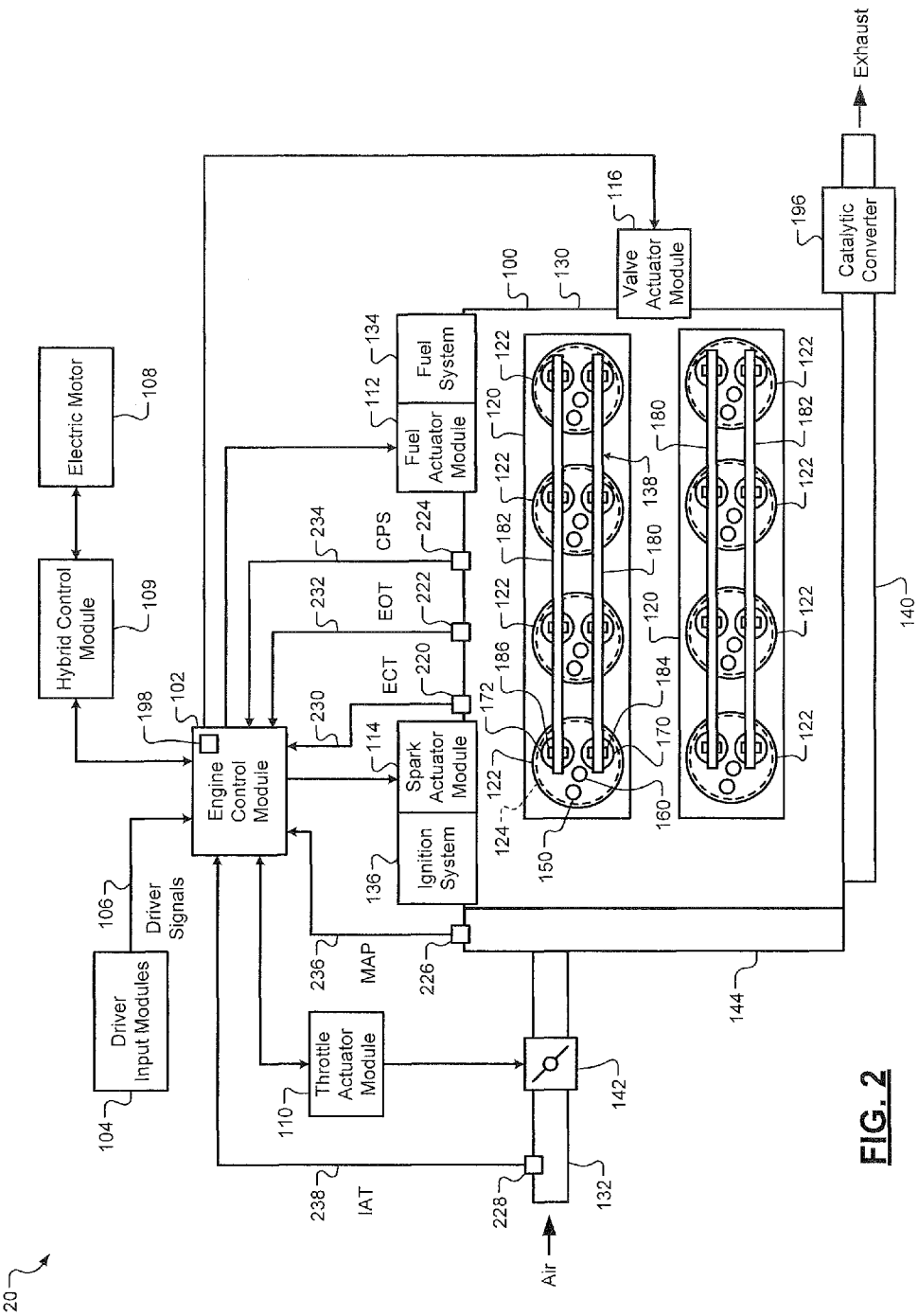
FIG. 2 is a functional block diagram illustrating an exemplary engine system according to the present disclosure.

With particular reference to FIGS. 2-3, functional block diagrams illustrate an exemplary implementation of the engine system 20 in more detail. Generally, the engine system 20 includes an internal combustion engine (ICE) 100 controlled by an engine control module (ECM) 102 based on various driver inputs, engine operating conditions, and other vehicle system signals. The driver inputs are received by driver input modules 104 that generate driver signals 106 in response to the driver inputs. The driver input modules 104 may include, for example, an accelerator pedal (not shown) and a brake pedal (not shown) manipulated by the driver that generate an accelerator pedal position signal and a brake pedal position signal, respectively. Various engine operating conditions and parameters are measured by one or more sensors and/or determined by one or more modules as discussed in further detail below. The vehicle system signals include signals generated by the various components of the engine system 20. In various implementations, the engine system 20 may be a hybrid engine system including an electric motor 108 controlled by a hybrid control module 109 in cooperation with the ECM 102. The engine system 20 presented further includes a throttle actuator module 110, a fuel actuator module 112, a spark actuator module 114, and a valve actuator module 116.

The ICE 100 produces drive torque by combusting an A/F mixture and may be one of several types. For example, the ICE 100 may be a spark-ignition (SI) engine or a compression-ignition (CI) engine. The ICE 100 may have a V-type configuration or an in-line configuration. For exemplary purposes, the ICE 100 is presented as a reciprocating, V-type engine including a pair of cylinder banks 120 defining cylinders 122, and pistons 124 coupled to a crankshaft 126 (see FIGS. 4-7). For exemplary purposes, eight cylinders 122 are presented, however, the ICE 100 may have fewer or additional cylinders. The pistons 124 reciprocate within the cylinders 122 between top-dead-center (TDC) positions and bottom-dead-center (BDC) positions. In the TDC positions, volumes of the cylinders 122 are at a minimum. In the BDC positions, volumes of the cylinders 122 are at a maximum.

The ICE 100 includes a block structure 130, an intake system 132, a fuel system 134, an ignition system 136, a valvetrain 138, and an exhaust system 140. The block structure 130 supports the various components of the ICE 100 and includes the cylinder banks 120. The intake system 132 controls a mass air flow (MAF) of air entering the ICE 100 and distributes the air to the cylinders 122. The intake system 132 may include a throttle 142 that controls MAF and an intake manifold 144 that distributes the air to the cylinders 122 via intake ports 146 (see FIGS. 4-14). The throttle 142 may include a butterfly valve having a rotatable blade. The throttle actuator module 110 may rotate the blade based on one or more air control values received from the ECM 102. The intake ports 146 may be defined by a pair of cylinder heads 148 mounted to the block structure 130.

The fuel system 134 supplies fuel to the ICE 100. The fuel system 134 may include a fuel tank assembly (not shown) that contains the fuel and one or more fuel injectors 150 that control fuel supplied to the ICE 100. In various implementations, such as central point injection and multi-point injection implementations, the fuel injectors 150 may inject fuel into the intake system 132 upstream of the cylinders 122. In alternate direct-injection implementations, the fuel injectors 150 may inject fuel directly into the cylinders 122. For exemplary purposes, the ICE 100 is presented as having a direct-injection system including fuel injectors 150 extending within the cylinders 122. The fuel actuator module 112 energizes the fuel injectors 150 based on one or more fuel control values received from the ECM 102.

The ignition system 136 supplies energy for initiating combustion within the cylinders 122 in the form of a spark. The ignition system 136 includes one or more spark plugs 160 extending within the cylinders 122 that supply the spark. The spark actuator module 114 energizes the spark plugs 160 based on one or more spark control values received from the ECM 102. In alternate implementations, such as CI implementations, the spark plugs 160 may be omitted and combustion may be initiated by compression of the AIF mixtures.

The valvetrain 138 controls the flow of air into the cylinders 122 and exhaust out of the cylinders 122. The valvetrain 138 includes intake and exhaust valves 170, 172 and intake and exhaust valve actuators 174, 176. One or more intake valves 170 and exhaust valves 172 may be provided for each of the cylinders 122. For exemplary purposes, each cylinder 122 includes a single intake valve 170 and a single exhaust valve 172. The intake valves 170 are moveable between closed positions and open positions. In the closed positions, the intake valves 170 close the cylinders 122 to the intake ports 146 and thereby inhibit fluid communication therebetween (see FIGS. 5-7 and FIGS. 9-15). In the open positions, the intake valves 170 open the cylinders 122 to the intake ports 146 and thereby enable fluid communication therebetween (see FIGS. 4, 8). The intake ports 146 may be defined by the cylinder heads 148.

The exhaust valves 172 are moveable between closed positions and open positions. In the closed positions, the exhaust valves 172 close the cylinders 122 to exhaust ports 178 (see FIGS. 4-6 and FIGS. 8-14) and thereby inhibit fluid communication therebetween. In the open positions, the exhaust valves 172 open the cylinders 122 to the exhaust ports 178 and thereby enable fluid communication therebetween. The exhaust ports 178 may be defined by the cylinder heads 148.

The intake and exhaust valve actuators 174, 176 are operable to selectively open and close the intake and exhaust valves 170, 172, respectively, and may be actuated using a variety of methods including, but not limited to, electro-mechanical actuation and hydraulic actuation. For exemplary purposes, the intake and exhaust valve actuators 174, 176 include intake and exhaust camshafts 180, 182 and hydraulically-actuated intake and exhaust valve displacement mechanisms 184, 186. The intake and exhaust camshafts 180, 182 may be synchronized with and driven by the crankshaft 126. For example, the intake and exhaust camshafts 180, 182 may be coupled to the crankshaft by a chain or belt and may rotate at one-half the speed of the crankshaft 126. The intake camshafts 180 include lobes 190 selectively engageable with the intake valves 170. The exhaust camshafts 182 include lobes 192 selectively engageable with the exhaust valves 172.

The intake and exhaust valve displacement mechanisms 184, 186 may be hydraulically-actuated using oil (not shown) circulated throughout the ICE 100 for lubrication and/or other purposes (i.e., engine oil). The intake valve displacement mechanisms 184 engage the intake valves 170 and the lobes 190 and selectively translate motion from the lobes 190 to displace the intake valves 170 between the open and closed positions. The intake valve displacement mechanisms 184 are individually operable in first and second modes. In the first operating mode, the intake valve displacement mechanisms 184 displace the intake valves 170 to the open positions when engaged with ramps and peaks of the lobes 190 (see FIGS. 4, 8). In the second operating mode, the intake valve displacement mechanisms 184 allow the intake valves 170 to remain in the closed positions when engaged with the ramps and the peaks (see FIG. 12). The intake valve displacement mechanisms 184 may include biasing members (not shown) that bias the intake valves 170 in the closed positions. The valve actuator module 116 actuates the intake valve displacement mechanisms 184 based on valvetrain control values received from the ECM 102. More specifically, the valve actuator module 116 switches the intake valve displacement mechanisms 184 between the first and second operating modes in response to the valvetrain control values.

The exhaust valve displacement mechanisms 186 engage the exhaust valves 172 and the lobes 192 and selectively translate motion from the lobes 192 to displace the exhaust valves 172 between the open and closed positions. The exhaust valve displacement mechanisms 186 are individually operable in first and second modes. In the first operating mode, the exhaust valve displacement mechanisms 186 displace the exhaust valves 172 to the open positions when engaged with ramps and peaks of the lobes 192 (see FIGS. 7 and 15). In the second operating mode, the exhaust valve displacement mechanisms 186 allow the exhaust valves 172 to remain in the closed positions when engaged with the ramps and the peaks (see FIG. 11). The exhaust valve displacement mechanisms 186 may include biasing members (not shown) that bias the exhaust valves 172 in the closed positions. The valve actuator module 116 actuates the exhaust valve displacement mechanisms 186 based on valvetrain control values received from the ECM 102. More specifically, the valve actuator module 116 switches the exhaust valve displacement mechanisms 186 between the first and second operating modes in response to the valvetrain control values.

The exhaust system 140 receives exhaust from the cylinders 122 via the exhaust ports 178 and includes a catalytic converter 196 that reduces concentrations of various by-products in the exhaust. The catalytic converter 196 may be one of various types. For example, the catalytic converter 196 may be a three-way catalytic converter that reduces the concentrations of $NO_x$, CO, and HC. Alternately, the catalytic converter 196 may be a two-way converter that reduces the concentrations CO and HC. The exhaust system 140 may also include other components for treating the exhaust, such as a particulate matter filter (not shown) that filters particulate from the exhaust. The exhaust system 140 may further include components for reducing noise associated with the exhaust, such as a muffler (not shown).

During operation of the ICE 100, intake air is drawn into the cylinders 122 through the throttle 142 and the intake manifold 144 by the pistons 124 and mixes with fuel supplied by the fuel injectors 150. The A/F mixtures are compressed by the pistons 124 and subsequently ignited by the spark plugs 160. Combustion of the A/F mixtures drives the pistons 124, which in turn drive the crankshaft 126 and thereby produce the drive torque. Exhaust produced by the combustion is forced out of the cylinders 122 by the pistons 124 into the exhaust system 140.

According to the present disclosure, the ICE 100 is configured to allow each of the cylinders 122 to operate according to two different engine cycles. A first engine cycle is a primary engine cycle used to operate the ICE 100 and may be selectively used to expel a majority of a heat of combustion into the exhaust system 140. For exemplary purposes, the primary engine cycle presented is a four-stroke engine cycle. A second engine cycle is a heat-conserving engine cycle selectively used to allow a majority of the heat of combustion to be retained within the ICE 100. By comparison, the heat-conserving engine cycle retains a burned charge (i.e., combusted A/F mixture) for an additional predetermined number of engine strokes over the primary engine cycle.

For exemplary purposes, the heat-conserving engine cycle presented is an eight-stroke engine cycle that retains a burned charge four additional strokes over the primary, four-stroke engine cycle. According to one example discussed in further detail below, one or more of the cylinders 122 may be operated using the four-stroke engine cycle while other cylinders 122 are operated according to the eight-stroke engine cycle. Operation of each of the cylinders 122 may switch between the four-stroke engine cycle and the eight-stroke engine cycle by switching the corresponding intake and exhaust valve displacement mechanisms 184, 186 between the first and second operating modes.

FIGS. 4-7 illustrate an exemplary four-stroke, primary engine cycle, which generally may follow a conventional four-stroke engine cycle. For simplicity, the four-stroke engine cycle will be described with reference to one of the cylinders 122 with the understanding that the following description applies equally to each of the cylinders 122. Generally, the four-stroke engine cycle includes four consecutive strokes of the piston 124. In the eight cylinder configuration of the ICE 100, the four strokes are completed over one engine cycle, or seven hundred and twenty (720) degrees of crankshaft rotation. Each stroke occurs over one hundred and eighty (180) degrees of crankshaft rotation. During each of the four strokes, the intake and exhaust valve displacement mechanisms 184, 186 are operated in the first operating mode.

With particular reference to FIG. 4, a first stroke of the four-stroke engine cycle may form an intake stroke occurring as the pistons 124 move from the TDC position to the BDC position. During the intake stroke, the intake valve 170 may be open, allowing air to enter the cylinder 122 via the intake port 146, the exhaust valve 172 may be closed, and a mass of fuel may be injected by the fuel injector 150 and mix with the air to create an NF mixture or charge. The mass of fuel injected may be controlled to achieve a fuel/air (F/A) equivalence ratio of the mixture of between approximately 1.10 and 0.95 and, more particularly, approximately 1.0. As used herein, F/A equivalence ratio generally refers to a ratio of an actual F/A ratio to a stoichiometric F/A ratio. At stoichiometric F/A ratios, complete combustion of the fuel may occur. At F/A equivalence ratios of approximately 1.0, heat transfer rates to walls of the cylinders 122 as a fraction of the fuel's chemical energy on a per cycle basis may be at a maximum, and may decrease for richer and leaner mixtures. Suitable engine operation can be achieved at F/A equivalence ratios of between 0.95 and 1.10. The F/A equivalence ratio each engine cycle may vary and F/A equivalence ratios greater than 1.0 may be provided to increase combustion temperatures. Increasing the combustion temperatures may further reduce a period required for engine warm-up.

With particular reference to FIG. 5, a second stroke follows the first stroke and may form a compression stroke occurring as the piston moves from the BDC position back to the TDC position. During the compression stroke, the intake valve 170 may be closed, the exhaust valve 172 may be closed, and the spark plug 160 may supply a spark for initiating combustion of the A/F mixture. With particular reference to FIG. 6, a third stroke follows the first stroke and may form a power stroke occurring as the piston 124 moves from the TDC position back to the BDC position. During the power stroke, the intake and exhaust valves 170, 172 may be closed. Combustion of the A/F mixture drives the piston 124 towards the BDC position. Under various operating conditions, the spark plug 160 may supply the spark during the power stroke (e.g., retarded spark timing), rather than the second or compression stroke (e.g., advanced spark timing). With particular reference to FIG. 7 a fourth stroke follows the third stroke and may form an exhaust stroke occurring as the piston 124 moves from the BDC position back to the TDC position. During the exhaust stroke, the intake valve 170 may be closed and the exhaust valve 172 may be open, allowing exhaust to exit the cylinder 122 via the exhaust port 178.

FIGS. 8-15 illustrate an exemplary eight-stroke, heat-conserving engine cycle according to the present disclosure. For simplicity, the eight-stroke engine cycle will be described with reference to one of the cylinders 122 with the understanding that the following description applies equally to each of the cylinders 122. Generally, the eight-stroke engine cycle is completed over eight consecutive strokes of the piston 124. The eight strokes are completed over fourteen hundred and forty (1440) degrees of crankshaft rotation. Each stroke occurs over one hundred and eighty (180) degrees of crankshaft rotation. During the eight strokes, the intake and exhaust valve displacement mechanisms 184, 186 are selectively switched between the first and second operating modes to allow a burned charge to be retained within the cylinder 122. The burned charge is retained for additional strokes of the piston 124, when compared to the four-stroke engine cycle.

With particular reference to FIG. 8, a first stroke (S1') of the eight-stroke engine cycle may form an intake stroke occurring as the piston 124 moves from a TDC position to a BDC position. During the intake stroke, the intake valve 170 may be open, allowing intake air into the cylinder 122 via the intake port 146, the exhaust valve 172 may be closed, and a mass of fuel may be injected by the fuel injector 150 and mix with the air to create an A/F mixture or charge. The mass of fuel injected may be controlled to achieve a fuel/air (F/A) equivalence ratio of the mixture of between approximately 1.10 and 0.95 and, more particularly, approximately 1.0. As discussed above, at F/A equivalence ratios of approximately 1.0, heat transfer rates to walls of the cylinders 122 as a fraction of the fuel's chemical energy on a per cycle basis may be at a maximum, and may decrease for richer and leaner mixtures. Additionally, suitable engine operation can be achieved at F/A equivalence ratios of between 0.95 and 1.10. The F/A equivalence ratio each engine cycle may vary and F/A equivalence ratios greater than 1.0 may be provided to increase combustion temperatures, and thereby further reduce a period required for engine warm-up.

During the first or intake stroke, the intake valve displacement mechanism 184 may be operated in the first operating mode. The intake valve displacement mechanism 184 may be switched into the first operating mode prior to or during the intake stroke. With particular reference to FIG. 9, a second stroke (S2') follows the first stroke and may form a first compression stroke occurring as the piston moves from the BDC position back to a TDC position. During the first compression stroke, the intake valve 170 may be closed, the exhaust valve 172 may be closed, and the spark plug 160 may supply a spark for initiating combustion of the A/F mixture.

With particular reference to FIG. 10, a third stroke (S3') follows the second stroke and may form a power stroke occurring as the piston 124 moves from the TDC position back to a BDC position. During the power stroke, the intake and exhaust valves 170, 172 may be closed. Combustion of the A/F mixture drives the piston 124 towards the BDC position. Under various operating conditions, the spark plug 160 may supply the spark during the third stroke, rather than the first compression stroke. With particular reference to FIG. 11, a fourth stroke (S4') follows the third stroke and may form a second compression stroke occurring as the piston 124 moves from the BDC position back to a TDC position. During the second compression stroke, the intake and exhaust valves 170, 172 may be closed, and the exhaust valve displacement mechanism 186 may be operated in the second operating mode. The exhaust valve displacement mechanism 186 may be switched to the second operating mode prior to or during the second compression stroke.

With particular reference to FIG. 12, a fifth stroke (S5') follows the fourth stroke and may form a first expansion stroke. During the first expansion stroke, the intake and exhaust valves 170, 172 may remain closed and the intake valve displacement mechanism 184 may be operated in the second operating mode. The intake valve displacement mechanism 184 may be switched into the second operating mode prior to or during the first expansion stroke. With particular reference to FIG. 13, a sixth stroke (S6') follows the fifth stroke and may form a second compression stroke. During the second compression stroke, the intake and exhaust valves 170, 172 may remain closed.

With particular reference to FIG. 14, a seventh stroke (S7') follows the sixth stroke and may form a second expansion stroke. During the second expansion stroke, the intake and exhaust valves 170, 172 may remain closed. With particular reference to FIG. 15, an eighth stroke (S8') follows the seventh stroke and may form an exhaust stroke during which exhaust exits the cylinder 122. During the eighth stroke or exhaust stroke, the intake valve 170 may be in the closed position, the exhaust valve 172 may be in the open position, and the exhaust valve displacement mechanism 186 may be operated in the first operating mode. The exhaust valve displacement mechanism 186 may be switched into the first operating mode prior to or during the exhaust stroke.

Referring again to FIG. 2, the ECM 102 regulates the drive torque produced by the ICE 100 by controlling various engine operating parameters including, but not limited to engine MAF, fueling rate, F/A equivalence ratio, and spark timing. The ECM 102 may control the operating parameters by periodically outputting control signals to the various components of the engine system 20, including the throttle actuator module 110, the fuel actuator module 112, the spark actuator module 114, and the valve actuator module 116. The control signals may be timed (i.e., synchronized) control signals relative to crankshaft rotational position. The control signals may specify a MAF, an amount of fuel (e.g., mass) to be delivered and/or a fueling rate, and spark timing relative to the TDC positions of the pistons 124.

According to the present disclosure, the ECM 102 includes a warm-up module 198 that selectively switches one or more cylinders 122 between the primary engine cycle and the heat-conserving engine cycle during an engine warm-up process. More specifically, for exemplary purposes, the warm-up module 198 selectively switches between the four-stroke primary engine cycle and the eight-stroke heat-conserving engine cycle discussed above. The warm-up module 198 selectively operates the ICE 100 according to the warm-up process when an engine temperature at or just after start-up is below a predetermined engine operating temperature. The warm-up process includes a first period and a second period.

During the first period, the warm-up module 198 may operate all of the cylinders 122 according to the primary engine cycle to allow a majority of the heat produced during combustion to be expelled into the exhaust system 140. In this way, the heat may be used to heat the catalytic converter 196 above a predetermined light-off temperature. The second period begins at an end of the first period when a catalyst temperature of the catalytic converter 196 has reached the light-off temperature. During the second period, the warm-up module 198 selectively switches one or more of the cylinders 122 from the primary engine cycle to the heat-conserving engine cycle to allow a majority of the heat produced by combustion to be retained within the cylinders 122. Retaining the heat within the cylinders 122 allows the heat to transfer to the block structure 130, and engine fluids such as the coolant and the lubricating oil, rather than be expelled in the exhaust. Retaining the heat may reduce a time and an amount of fuel required to warm the ICE 100 to a desired engine operating temperature. By selectively switching operation between the primary and heat-conserving engine cycles based on the catalyst temperature, the warm-up module 198 may improve engine warm-up while maintaining desired exhaust emission and fuel economy levels.

Figure 16:
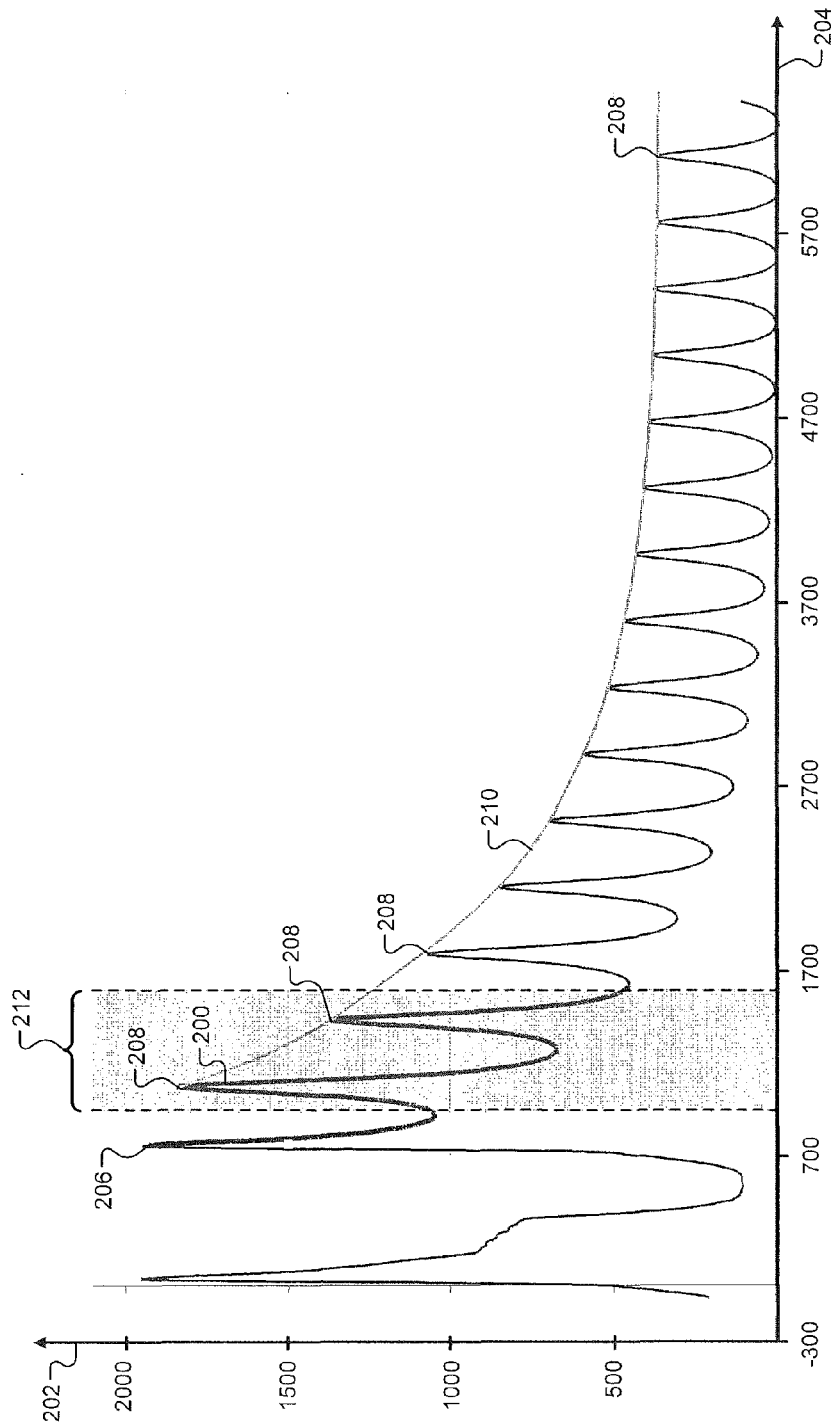
FIG. 16 is a plot of cylinder temperature versus crankshaft angle illustrating heat transfer rates between a cylinder of an engine and surrounding engine structure according to the present disclosure.

With particular reference to FIG. 16, a plot 200 of cylinder temperature along a first or y-axis 202 versus crankshaft angle along a second or x-axis 204 is shown. The plot 200 illustrates temperature changes in a trapped charge, and thereby illustrates rates of heat transfer between the trapped charge and the surrounding block structure. The plot 200 was obtained through computational analysis of an exemplary engine operating at twelve hundred revolutions per minute (1200 RPM), thirty kiloPascals (30 kPa) of manifold absolute pressure (MAP), and an engine coolant temperature (ECT) of ninetyfive degrees Celsius (95° C.). For the analysis, it was assumed that the trapped charge was completely retained within the cylinder (i.e., no blow by). A peak 206 illustrates a maximum temperature of an A/F mixture or charge during a power stroke. Peaks 208 illustrate maximum temperatures of the charge during subsequent compression strokes following the power stroke.

A curve 210 fit to the peaks 208 illustrates a temperature drop between consecutive compression strokes while the charge remains trapped within the cylinder. The temperature drop is indicative of an amount of heat transferred from the charge to the surrounding block structure. The plot 200 illustrates that a majority of the heat contained in the charge can be transferred to the surrounding block structure between seven hundred and twenty (720) and fourteen hundred and forty (1440) degrees of crankshaft rotation after combusting the charge. A first seven hundred and twenty (720) degrees after the power stroke is indicated by the brackets identified by reference numeral 212. Thus, in engines primarily operating according to a four-stroke engine cycle, an eight-stroke and/or a twelve-stroke heat-conserving engine cycle may be used to allow a majority of the heat produced by combustion to be retained within the engine, rather than expelled through the exhaust.

Referring again to FIG. 2, the warm-up module 198 operates the ICE 100 according to the engine warm-up process based on the driver inputs and various operating parameters including, but not limited to, engine temperature, engine speed, engine output torque, and catalyst temperature. The operating parameters may be measured by one or more sensors or estimated based on outputs of various sensors. In an exemplary implementation, the sensors may include an ECT sensor 220, an engine oil temperature (EOT) sensor 222, a crankshaft position (CPS) sensor 224, a MAP sensor 226, and an intake air temperature (IAT) sensor 228.

The ECT sensor 220 may be in communication with a coolant (not shown) used to cool the ICE 100 and may sense the ECT. The ECT sensor 220 may output an ECT signal 230 indicative of a current ECT sensed. The EOT sensor 222 may be in communication with the engine oil and may sense the EOT. The EOT sensor 222 may output an EOT signal 232 indicative of a current EOT sensed. The CPS sensor 224 may sense a rotational position of the crankshaft 126 and output a CPS signal 234 indicative of a current crankshaft rotational position sensed and a current engine speed. The MAP sensor 226 may be in communication with the air within the intake manifold 144 and may sense the MAP. The MAP sensor 226 may output a MAP signal 236 indicative of a current MAP sensed. The IAT sensor 228 may be in communication with the air upstream of the throttle 142 and may sense the IAT. The IAT sensor 228 may output an IAT signal 238 indicative of a current IAT sensed.

Figure 17:
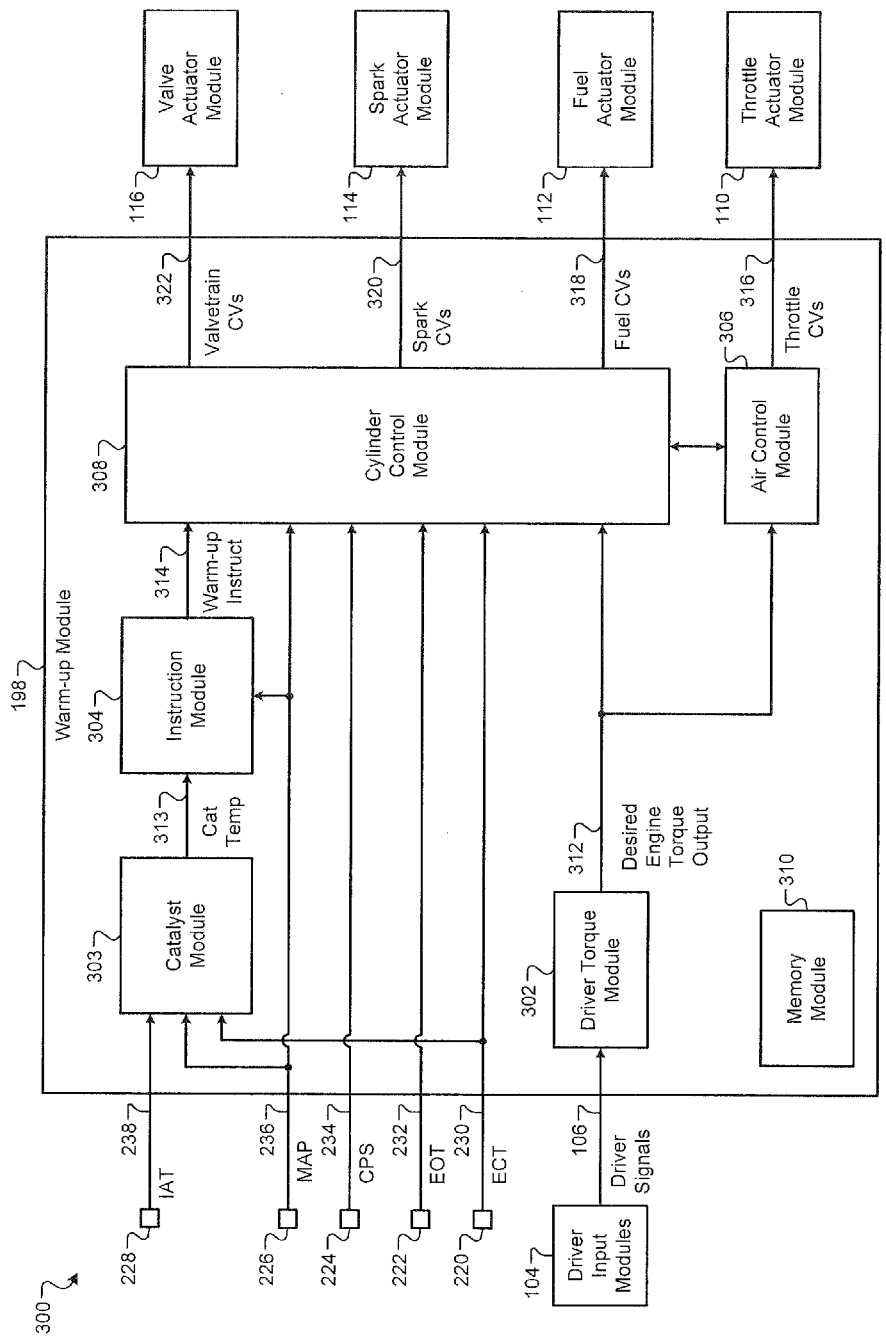
FIG. 17 is a functional block diagram illustrating an exemplary engine control system according to the present disclosure.

With particular reference to FIG. 17, an exemplary implementation of the warm-up module 198 in an exemplary engine control system 300 is presented. The warm-up module 198 outputs various timed control signals used to control operation of the ICE 100. The warm-up module 198 includes a driver torque module 302, a catalyst module 303, an instruction module 304, an air control module 306, a cylinder control module 308, and a memory module 310. The driver torque module 302 determines a desired engine torque output based on the driver signals 106 and outputs a signal 312 indicative of the desired engine torque output. The desired engine torque output may be based on an estimated drive torque desired by the driver and an estimated motor torque output available from the electric motor 108.

The catalyst module 303 periodically determines a current catalyst temperature of the catalytic converter 196 and outputs a catalyst temperature signal 313 indicative of the catalyst temperature. The catalyst module 303 may determine the current catalyst temperature every predetermined period according to various methods. For example, the catalyst module 303 may measure the catalyst temperature using a temperature sensor (not shown) extending within the catalytic converter 196 or within the exhaust system 140 upstream of the catalytic converter. The temperature sensor may measure the catalyst temperature directly, or indirectly, by measuring a temperature of exhaust entering the catalytic converter 196.

As another example, the catalyst module 303 may estimate the catalyst temperature based on a temperature relationship defined as a function of various engine operating parameters. For example, a temperature relationship defined as a function of engine run time, MAF, MAP, IAT, fueling rate, ECT, and engine cycle may be used. The relationship may be modeled by an equation and/or may be stored in the memory module 310 as a lookup table. Accordingly, the catalyst module 303 may lookup the catalyst temperature within the memory module 310 based on the ECT signal 230, the MAP signal 236, the IAT signal 238, and other inputs indicative of the fueling rate, engine cycle, and other engine parameters.

The instruction module 304 determines when to begin and end an engine warm-up process based on various inputs. More specifically, the instruction module 304 determines when to begin and end first and second periods of the engine warm-up process based on a current engine temperature and the current catalyst temperature. The instruction module 304 instructs the cylinder control module 308 when to begin and end the first and second periods of the engine warm-up process via a warm-up instruction signal 314. The instruction module 304 may instruct the cylinder control module 308 to begin a first period of an engine warm-up process within a predetermined period of engine starting. The instruction module 304 may provide the instruction when the current engine temperature is less than a desired engine operating temperature when the ICE 100 is fully warmed up. In various implementations, the current engine operating temperature may be measured via the ECT sensor 220. Accordingly, for exemplary purposes, the instruction module 304 provides the instruction to begin the first period when the current ECT is less than a predetermined coolant temperature of, for example, around ninety degrees Celsius (90° C.).

The instruction module 304 ends the first period and provides the instruction to begin the second period when the current catalyst temperature is greater than a predetermined catalyst light-off temperature. Generally, the catalyst light-off temperature may be a catalyst temperature above which the catalytic converter 196 has a desired conversion efficiency. In various implementations, the catalyst light-off temperature may be retrieved from a lookup table in the memory module 310 based on one or more engine operating parameters including, for example, total engine run time. For exemplary purposes, the catalyst light-off temperature is a single predetermined temperature retrieved from the memory module 310. The instruction module 304 ends the second period and instructs the cylinder control module 308 to end the warm-up process when the current ECT is greater than the predetermined coolant temperature.

The air control module 306 controls the MAF through the intake system 132 based on the desired engine torque output. The air control module 306 may control the MAF by communicating one or more air control values to the throttle actuator module 110 via a throttle signal 316. For example, the air control module 306 may determine a throttle area based on the desired engine torque output and may communicate the throttle area via the throttle signal 316.

The cylinder control module 308 controls combustion within each of the cylinders 122 based on various inputs including, but not limited to, the desired engine torque output, the air control values, and the warm-up instructions. The cylinder control module 308 controls combustion by controlling intake and exhaust valve timing, fueling, and spark timing for each of the cylinders 122. The cylinder control module 308 may control combustion by communicating one or more fuel control values, spark control values, and valvetrain control values to the fuel actuator module 112, the spark actuator module 114, and the valve actuator module 116, respectively. The cylinder control module 308 may communicate the fuel control values, the spark control values, and the valvetrain control values via timed signals 318, 320, 322, respectively.

The fuel control values may include an amount (e.g., mass) of fuel to be provided to each of the cylinders 122 and a timing reference for delivering the fuel amount (i.e., fuel timing). The fuel timing may be specified relative to the TDC positions. The spark control values may include a spark timing relative to the TDC positions. The valvetrain control values may specify one of the first and second operating modes for each of the intake and exhaust valve displacement mechanisms 184, 186, and intake and exhaust valve timing.

The cylinder control module 308 selectively operates each of the cylinders 122 according to one of the four-stroke engine cycle and the eight-stroke engine cycle, based on the desired engine torque output, the air control values, and the warm-up instructions. In response to an instruction to begin a first period of a warm-up process, the cylinder control module 308 may operate all of the cylinders 122 according to the four-stroke engine cycle by specifying that the intake and exhaust valve lift mechanisms each operate in the first operating mode. In response to an instruction to end the first period and begin a second period of the warm-up process, the cylinder control module 308 may select one or more of the cylinders 122 to operate according to the eight-stroke engine cycle. The cylinder control module 308 outputs appropriate fuel control values, spark control values, and valvetrain control values for operating the one or more selected cylinders 122 according to the eight-stroke engine cycle while operating the remaining cylinders 122 according to the four-stroke engine cycle.

The cylinder control module 308 begins operating each of the selected cylinders according to the eight-stroke engine cycle when the current catalyst temperature is greater than the predetermined catalyst light-off temperature and one or more criteria are met. Generally, the criteria may include whether the current EOT is within a predetermined EOT range, a current engine torque output is less than a predetermined engine torque, and the current engine speed is less than a predetermined engine speed. The cylinder control module 308 begins operating the selected cylinders according to the eight-stroke engine cycle when the current EOT is within the predetermined EOT range, the current engine torque output is less than the predetermined engine torque, and the current engine speed is less than the predetermined engine speed.

The predetermined EOT range, engine torque, and engine speed may be retrieved from tables in the memory module 310 based on one or more engine operating parameters. For exemplary purposes, the predetermined EOT range may be a single range of between negative thirty degrees Celsius (−30° C.) and ninety degrees Celsius (90° C.). The predetermined engine torque may be a torque of around ten percent (10%) of a peak engine torque at the current engine speed. The predetermined engine speed may be a single speed of around fifteen hundred (1500) RPM.

In various implementations, an engine torque relationship may be defined as a function of MAP and a number of cylinders currently operating according to the heat-conserving engine cycle. The engine torque relationship may be modeled as an equation or in a lookup table stored in the memory module 310. Accordingly, the criteria may include whether a current MAP is less than a predetermined MAP. The predetermined MAP may vary based on a number of cylinders operating according to the eight-stroke engine cycle. For example, the predetermined MAP may vary from around fifty kiloPascals (50 kPa) when all of the cylinders 122 are operating according to the four-stroke engine cycle to between around eighty kiloPascals (80 kPa) and ninety kiloPascals (90 kPa) while two or more of the cylinders 122 are operating according to the eight-stroke engine cycle. The predetermined MAP may be retrieved from lookup tables in the memory module 310.

The cylinder control module 308 may output the various control values to begin operating each of the selected cylinders according to the eight-stroke engine cycle during the corresponding next intake stroke. The cylinder control module 308 may output the various control values to continue operating each of the selected cylinders for predetermined periods while the criteria for beginning the second period of the warm-up process continue to be met. The cylinder control module 308 may switch the selected cylinders back to a four-stroke engine cycle when one or more of the criteria is no longer satisfied.

The periods may vary by cylinder and may vary based on a number of the cylinders 122 selected. Generally, the periods may be an integer multiple of a period required to complete the eight-stroke engine cycle, for example, fourteen hundred and forty (1440) degrees of crankshaft rotation. Thus, each selected cylinder may complete a single eight-stroke engine cycle, or multiple eight-stroke engine cycles before switching back to a four-stroke engine cycle at the end of a corresponding period.

The cylinder control module 308 may select one or more of the cylinders 122 according to various predetermined strategies. Generally, the strategies may be predetermined to ensure engine vibration does not exceed a predetermined vibration intensity. In various implementations, pairs of the cylinders 122 may be selected and the pairs may be successively operated according to the eight-stroke engine cycle. The pairs may be selected based on a cylinder arrangement (e.g., in-line, V-type, etc.). For example, in a four-cylinder in-line arrangement, a first pair may include two end cylinders, while a second pair may include two middle cylinders. An order of successively operating the selected cylinders 122 may be based on a firing order, or sequence of power delivery by the cylinders 122. Generally, the firing order may be specified relative to a cylinder numbering, which may be based on locations along the crankshaft 126 where the pistons 124 are coupled.

For exemplary purposes, a left bank of the cylinder banks 120 may include cylinder numbers 1, 3, 5, and 7 front to rear, while a right bank of the cylinder banks 120 may include cylinder numbers 2, 4, 6, and 8. Numbered in the foregoing manner, an exemplary firing order may be 1-8-7-2-6-5-4-3. According to the foregoing cylinder numbering and firing order, the cylinder control module 308 may select cylinder numbers one (1) and six (6) to operate according to the eight-stroke engine cycle simultaneously for predetermined first periods. The cylinder control module 308 may select cylinder numbers four (4) and seven (7) to operate according to the eight-stroke engine cycle simultaneously for predetermined second periods following the first periods. Cylinder number four may switch from a four-stroke engine cycle to an eight-stroke engine cycle on the next intake stroke following the end of the first period when cylinder six switches from an eight-stroke engine cycle back to a four-stroke engine cycle.

The memory module 310 stores various information and control values used by the engine control system 300 including, but not limited to, various lookup tables where the control values are stored. The memory module 310 may include a combination of volatile and non-volatile memory where the information and control values are stored for retrieval.

Figure 18:
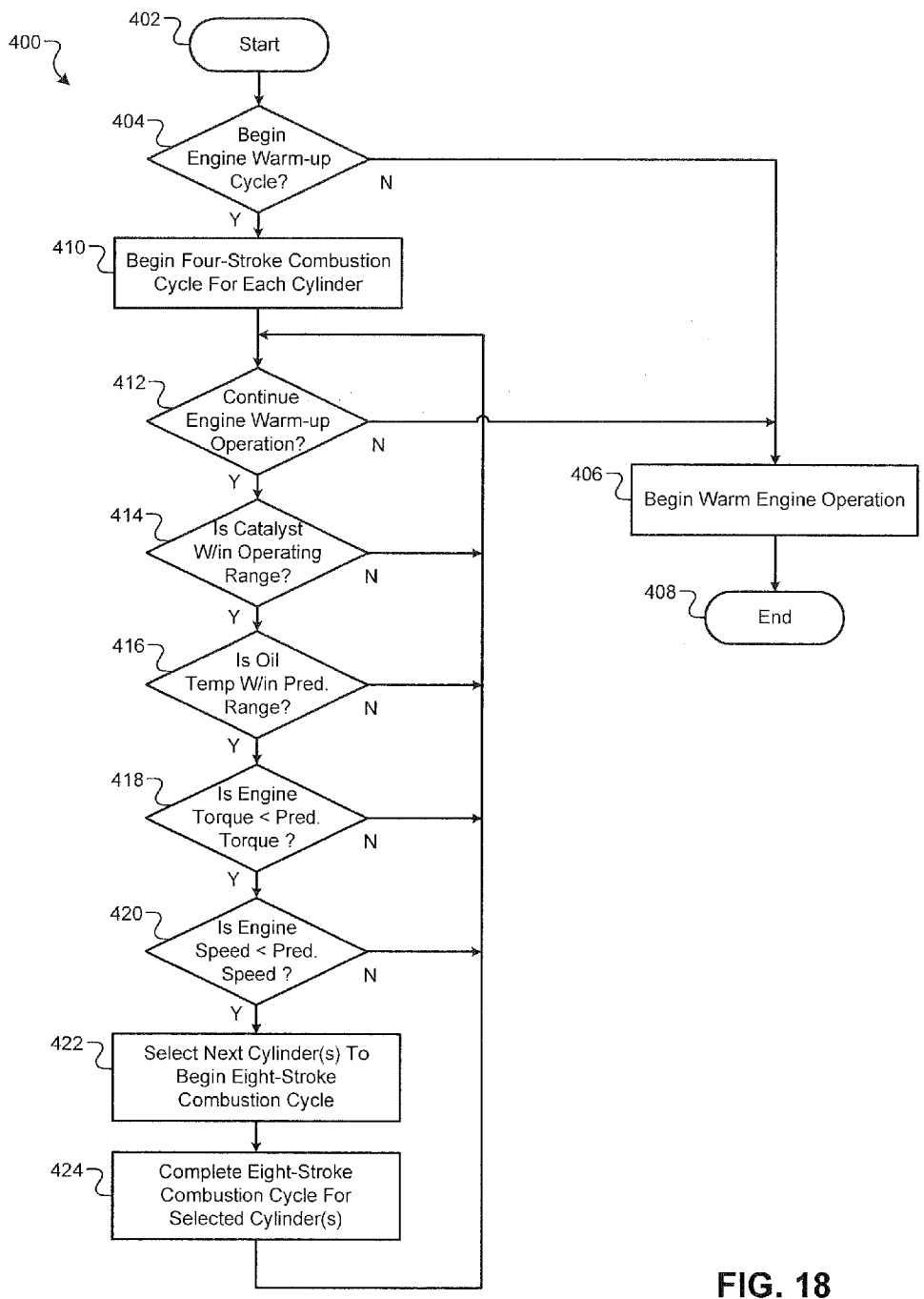
FIG. 18 is a flow diagram illustrating an exemplary method for controlling an engine according to the present disclosure.

With particular reference to FIG. 18, an exemplary method 400 for controlling an internal combustion engine according to the present disclosure is shown. The method 400 may be implemented by one or more modules of an engine control system, such as the engine control system 300 described above. The method 400 may proceed in a periodic manner and repeat every predetermined period until the method 400 exits. For exemplary purposes, the method 400 will be described with reference to the various components of the engine control system 300 described above. In this way, operation of the engine control system 300 may also be more fully described.

The method 400 starts at 402 within a predetermined period of starting the ICE 100. For example, the method 400 may begin as soon as the ICE 100 has started. At 404, the instruction module 304 determines whether to begin an engine warm-up process by determining whether the current ECT is less than the predetermined ECT. If yes, then the instruction module 304 instructs the cylinder control module 308 to begin a first period of the engine warm-up process and control proceeds at 410. If no, control proceeds at 406 to begin warm engine operation according to other methods and the method 400 ends as shown at 408.

At 410, in response to the instruction at 404, the cylinder control module 308 begins a first period of operating all of the cylinders 122 according to the four-stroke engine cycle. In various implementations, all of the cylinders 122 may already be operating according to the four stroke engine cycle when control arrives at 410. Accordingly, the cylinder control module 308 may continue operating all of the cylinders 122 according to the four-stroke engine cycle at 410.

Control proceeds at 412 where the instruction module 304 determines whether to continue the engine warm-up process by determining whether the current ECT is less than the predetermined ECT. If yes, then control proceeds at 414, otherwise, control proceeds at 406 as previously described. At 414, the instruction module 304 determines whether the current catalyst temperature determined by the catalyst module 303 is greater than the predetermined catalyst light-off temperature. If yes, then control proceeds at 416, otherwise, control loops back and proceeds at 412 to begin another control loop of the method 400.

At 416, the instruction module 304 determines whether the current EOT is within the predetermined EOT range. If yes, then control proceeds at 418, otherwise, control loops back and proceeds at 412 to begin another control loop of the method 400. At 418, the cylinder control module 308 determines whether the current engine torque output is less than the predetermined engine torque. More specifically, the cylinder control module 308 determines whether the current MAP is less than the predetermined MAP. If yes, then control proceeds at 420, otherwise, control loops back and proceeds at 412 to begin another control loop of the method 400. At 420, the instruction module 304 determines whether the current engine speed is less than the predetermined engine speed. If yes, then the instruction module 304 instructs the cylinder control module 308 to begin a second period of the warm-up process and control proceeds at 422. If no, then control loops back and proceeds at 412 to begin another control loop of the method 400.

At 422, in response to the instruction at 420, the cylinder control module 308 selects the next cylinders to begin operating according to the eight-stroke engine cycle and control proceeds at 424. More specifically, the cylinder control module 308 selects one of the first pair of the cylinders 122 including cylinders one and six and the second pair of the cylinders 122 including cylinders four and seven. During consecutive control loops, the cylinder control module 308 alternates the selection between the first and second pairs.

At 424, the cylinder control module 308 completes eight-stroke engine cycles in the next cylinders selected at 422 by outputting the appropriate fuel, spark, and valvetrain control values for the next cylinders beginning at the corresponding next intake strokes. From 424, control loops back and proceeds at 412 to begin another control loop of the method 400.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
  a first electronic circuit configured to determine a catalyst temperature; and
  a second electronic circuit configured to, when said catalyst temperature is greater than a predetermined light-off temperature, selectively switch operation of a first cylinder from a first engine cycle having four strokes to a second engine cycle having N times four strokes, wherein N is an integer greater than one.

2. The engine control system of claim 1, wherein said first cylinder is closed for at least four consecutive strokes when operating in said second engine cycle.

3. The engine control system of claim 1, wherein said second electronic circuit is configured to control an air/fuel ratio of said first cylinder by controlling a mass of fuel supplied upstream of said first cylinder.

4. The engine control system of claim 1, wherein said second electronic circuit is configured to control an air/fuel ratio of said first cylinder by controlling a mass of fuel supplied directly to said first cylinder.

5. The engine control system of claim 1 wherein the first and second electronic circuits include at least one of an Application Specific Integrated Circuit (ASIC), a field programmable gate array (FPGA), a processor, and a combinational logic circuit.

6. The engine control system of claim 1, wherein said second electronic circuit is configured to switch operation of said first cylinder when:
  (a) an engine temperature is within a predetermined temperature range;
  (b) an estimated engine torque output is less than a predetermined torque; and
  (c) an engine speed is less than a predetermined speed.

7. The engine control system of claim 1, wherein said second electronic circuit is configured to:
  operate said first cylinder in said first engine cycle while an engine temperature is less than a predetermined engine temperature and said catalyst temperature is less than said predetermined light-off temperature; and
  switch operation of said first cylinder to said second engine cycle after said catalyst temperature is greater than said predetermined light-off temperature.

8. The engine control system of claim 1, wherein said second electronic circuit is configured to:
  switch operation of said first cylinder to said first engine cycle after a predetermined period; and
  switch operation of a second cylinder to said second engine cycle on a next intake stroke after said first cylinder switches to said first engine cycle.

9. The engine control system of claim 1, wherein said second electronic circuit is configured to supply fuel to said first cylinder during one stroke of said second engine cycle and refrains from supplying fuel to said first cylinder during other strokes of said second engine cycle.

10. The engine control system of claim 9, wherein said second electronic circuit is configured to supply a stoichiometric air/fuel mixture to said first cylinder during said one stroke.

11. A method for controlling an engine, comprising:
  determining a catalyst temperature; and
  when said catalyst temperature is greater than a predetermined light-off temperature, selectively switching operation of a first cylinder from a first engine cycle having four strokes to a second engine cycle having N times four strokes, wherein N is an integer greater than one.

12. The method of claim 11, further comprising closing said first cylinder for at least four consecutive strokes of said second engine cycle.

13. The method of claim 11, further comprising controlling an air/fuel ratio of said first cylinder by controlling a mass of fuel supplied upstream of said first cylinder.

14. The method of claim 11, further comprising controlling an air/fuel ratio of said first cylinder by controlling a mass of fuel, supplied directly to said first cylinder.

15. The method of claim 11, wherein said selectively switching includes switching operation of said first cylinder when:
  (a) an engine temperature is within a predetermined temperature range;
  (b) an estimated engine torque output is less than a predetermined torque; and
  (c) an engine speed is less than a predetermined speed.

16. The method of claim 11, further comprising:
  operating said first cylinder in said first engine cycle while an engine temperature is less than a predetermined engine temperature and said catalyst temperature is less than said predetermined light-off temperature; and
  switching operation of said first cylinder to said second engine cycle after said catalyst temperature is greater than said predetermined light-off temperature.

17. The method of claim 11, further comprising:
  switching operation of said first cylinder to said first engine cycle after a predetermined period; and
  switching operation of a second cylinder to said second engine cycle on a next intake stroke after said switching operation of said first cylinder to said first engine cycle.

18. The method of claim 11, further comprising:
  supplying fuel to said first cylinder during one stroke of said second engine cycle; and
  refraining from supplying fuel to said first cylinder during other strokes of said second engine cycle.

19. The method of claim 18, wherein said supplying fuel includes supplying a stoichiometric air/fuel mixture to said first cylinder during said one stroke.

20. A method for controlling an engine, comprising:
  determining a catalyst temperature;
  selectively switching operation of a first cylinder from a first engine cycle having four strokes to a second engine cycle having N times four strokes, based on said catalyst temperature, wherein N is an integer greater than one; and
  closing said first cylinder for at least four consecutive strokes of said second engine cycle.

* * * * *